United States Patent
Graham et al.

(10) Patent No.: US 6,605,136 B1
(45) Date of Patent: Aug. 12, 2003

(54) PRESSURE SWING ADSORPTION PROCESS OPERATION AND OPTIMIZATION

(75) Inventors: David Ross Graham, Lansdale, PA (US); Roger Dean Whitley, Allentown, PA (US); Robert Ling Chiang, Basking Ridge, NJ (US); Edward Landis Weist, Jr., Macungie, PA (US); Timothy Christopher Golden, Allentown, PA (US); Matthew James Labuda, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 10/192,360

(22) Filed: Jul. 10, 2002

(51) Int. Cl.$^7$ .............................................. B01D 53/047
(52) U.S. Cl. ............................... 95/98; 95/100; 95/103; 95/105; 95/130; 95/140
(58) Field of Search ....................... 95/96–98, 100–105, 95/130, 140

(56) References Cited

U.S. PATENT DOCUMENTS

| | | | | |
|---|---|---|---|---|
| 3,430,418 A | * | 3/1969 | Wagner ........................ | 95/100 |
| 4,194,891 A | * | 3/1980 | Earls et al. ..................... | 95/98 |
| 5,672,195 A | | 9/1997 | Moreau et al. ................ | 95/96 |
| 5,891,218 A | | 4/1999 | Rouge et al. .................. | 95/96 |
| 6,022,397 A | * | 2/2000 | Rouge et al. .................. | 95/96 |
| 6,068,678 A | * | 5/2000 | Labasque et al. ............. | 95/96 |
| 6,156,101 A | | 12/2000 | Naheiri ......................... | 95/101 |
| 6,302,943 B1 | * | 10/2001 | Johnson et al. ................ | 95/96 |
| 6,328,786 B1 | * | 12/2001 | Labasque et al. ............. | 95/96 |
| 6,336,956 B1 | * | 1/2002 | Moreau et al. ................ | 95/96 |
| 6,425,939 B1 | * | 7/2002 | Moreau et al. ................ | 95/117 |
| 6,444,014 B1 | | 9/2002 | Mullhaupt et al. ............ | 95/130 |
| 6,464,756 B1 | * | 10/2002 | Plee .............................. | 95/96 |
| 6,468,328 B2 | * | 10/2002 | Sircar et al. ................... | 95/101 |
| 6,500,234 B1 | * | 12/2002 | Ackley et al. ................. | 95/96 |
| 6,506,234 B1 | * | 1/2003 | Ackley et al. ................. | 95/96 |

FOREIGN PATENT DOCUMENTS

| | | | |
|---|---|---|---|
| WO | WO99/43415 | 9/1999 | ......... B01D/53/047 |
| WO | WO99/43416 | 9/1999 | ......... B01D/53/047 |
| WO | WO99/43417 | 9/1999 | ......... B01D/53/047 |
| WO | WO99/43418 | 9/1999 | ......... B01D/53/053 |

OTHER PUBLICATIONS

Kumar, R., et al., "A Versatile Process Simulator for Adsorptive Separations", *Chemical Engineering Science*, vol. 49, No. 18, pp. 3115–3125.

Yang, Ralph T., "Gas Separation by Adsorption Processes", *Imperial College Press*, 1987, pp. 141–200.

Hartzog, D. G. and Sircar, S., "Sensitivity of PSA Process Performance to Input Variables", *Adsorption* 1, 133–151 (1995).

Keller II, George E., et al., "A New Process for Adsorption Separation of Gas Streams", *ACS Symposium Series 135*, 1980, pp. 275–286.

* cited by examiner

Primary Examiner—Robert H. Spitzer
(74) Attorney, Agent, or Firm—John M. Fernbacher

(57) ABSTRACT

A pressure swing adsorption process which comprises introducing a feed gas mixture into an inlet of an adsorber vessel during a feed period, wherein the feed gas mixture contains a more strongly adsorbable component and a less strongly adsorbable component and the adsorber vessel contains a bed of adsorbent material which selectively adsorbs the more strongly adsorbable component, and withdrawing a product gas enriched in the less strongly adsorbable component from an outlet of the adsorber vessel during at least a portion of the feed period, wherein a dimensionless cycle-compensated mass transfer coefficient defined as $K\, t_{feed} V_{ads}/V_{feed}$ is maintained in the range of about 23 to about 250.

22 Claims, 5 Drawing Sheets

PRESSURE SWING ADSORPTION PROCESS OPERATION AND OPTIMIZATION

BACKGROUND OF THE INVENTION

Pressure swing adsorption is an important gas separation process which is widely used in the process and manufacturing industries. Pressure swing adsorption is used for recovering high-purity gas products from crude process gas streams, for example in hydrogen production, or as an alternative to hauled-in atmospheric gas products or onsite cryogenic air separation processes. The pressure swing adsorption process has been highly developed for the separation of a wide variety of gas mixtures including, for example, the separation of air to provide oxygen and nitrogen products. For smaller product volumes in air separation applications, pressure swing adsorption processes may use a single adsorbent bed and one or more gas storage tanks to provide a constant product flow as well as gas for repressurization and purge. At higher product volumes, multiple adsorbent beds operating in parallel with overlapping cycles are used to generate a constant product gas flow as well as provide gas for repressurization and purge.

Pressure swing adsorption processes can be operated wherein the maximum and minimum cycle pressures are both superatmospheric, wherein the maximum cycle pressure is superatmospheric and the minimum cycle pressure is atmospheric, wherein the maximum cycle pressure is superatmospheric and the minimum cycle pressure is subatmospheric, or wherein the maximum cycle pressure is near atmospheric and the minimum cycle pressure is subatmospheric. The latter two processes have been described in the art as vacuum-pressure swing adsorption (VPSA) and vacuum swing adsorption (VSA). For the purposes of the present disclosure, the generic term "pressure swing adsorption" or PSA will be used to describe any cyclic gas adsorption process which utilizes the effect of pressure on adsorbent capacity to separate gas mixtures. The pressures utilized in a generic PSA process can be superatmospheric, subatmospheric, atmospheric, or combinations thereof.

PSA process technology has been improved significantly over the past decade. Sophisticated process cycles and improved adsorbents have led to more efficient and economical operating PSA plants, particularly for the separation of air, the recovery of hydrogen and carbon monoxide from synthesis gas, and the recovery of hydrogen and light hydrocarbons from gas streams in refineries and petrochemical plants. Further improvements are desirable and continue to be pursued by users of PSA technology.

Two important measures of PSA process performance are the amount of adsorbent required for a given production rate and the percent recovery of the desired product from the feed gas mixture. A known method to reduce the adsorbent requirement is to decrease the cycle time with the pressure envelope held constant. A decrease in cycle time, however, may have a negative impact on recovery. Also, reductions in cycle time may lead to severe problems caused by resulting high gas velocities, including high pressure drop, fluidization, and attrition of the adsorbent material. Therefore, a method is needed to select optimum operating conditions for PSA systems so that an appropriate tradeoff can be achieved between the low adsorbent requirement associated with fast cycles and the potential negative effects associated with fast cycles. The present invention, which is described below and defined by the claims which follow, provides a simple method to achieve this tradeoff.

BRIEF SUMMARY OF THE INVENTION

The invention relates to a pressure swing adsorption process which comprises introducing a feed gas mixture into an inlet of an adsorber vessel during a feed period, wherein the feed gas mixture contains a more strongly adsorbable component and a less strongly adsorbable component and the adsorber vessel contains a bed of adsorbent material which selectively adsorbs the more strongly adsorbable component, and withdrawing a product gas enriched in the less strongly adsorbable component from an outlet of the adsorber vessel during at least a portion of the feed period, wherein a dimensionless cycle-compensated mass transfer coefficient defined as $K\, t_{feed} V_{ads}/V_{feed}$ is maintained in the range of about 23 to about 250, where K is the linear driving force mass transfer coefficient for diffusion of the more strongly adsorbable component in the adsorbent closest to a product end of the bed of adsorbent material, $t_{feed}$ is the duration of the feed period, $V_{ads}$ is the empty volume of a section of the adsorber vessel which contains the bed of adsorbent material, and $V_{feed}$ is the volume of the feed gas mixture introduced into the inlet of the adsorber vessel during the feed period, and wherein $V_{feed}$ is defined as $NRT/P_{ads}$, where N is the number of moles of the feed gas mixture introduced into the inlet of the adsorber vessel during the feed period $t_{feed}$, R is the universal gas constant, T is the average absolute temperature of the feed gas mixture at the inlet of the adsorber vessel, and $P_{ads}$ is the absolute pressure of the feed gas at the inlet of the adsorber vessel. The more strongly adsorbed component may be nitrogen and the less strongly adsorbed component may be oxygen.

The value of $K\, t_{feed} V_{ads}/V_{feed}$ may be maintained in the range of about 23 to about 100. The adsorbent material may comprise one or more zeolites, with or without binder material, selected from the group consisting of CaA, NaX, CaX, BaX, LiX, NaLSX, CaLSX, BaLSX, and LiLSX zeolites.

The more strongly adsorbed component may be carbon monoxide and the less strongly adsorbed component may be hydrogen. In this embodiment, $K\, t_{feed} V_{ads}/V_{feed}$ may be maintained in the range of about 66 to about 250. The adsorbent material may comprise one or more zeolites, with or without binder material, selected from the group consisting of CaA, NaX, CaX, BaX, LiX, NaLSX, CaLSX, BaLSX, and LiLSX zeolites.

Typically, the duration of the feed period is in the range of about 7 to about 120 seconds and the adsorbent material comprises particles with an average particle diameter in the range of about 1.2 to about 1.6 mm. More specifically, the duration of the feed period may be in the range of about 3 to about 60 seconds and the adsorbent material may comprise particles with an average particle diameter in the range of about 0.8 to about 1.2 mm.

The duration of the feed period may be in the range of about 0.25 to about 30 seconds and the adsorbent material may comprise particles with an average particle diameter in the range of about 0.3 to about 0.8 mm.

The process may further comprise a purge period during which a purge gas is introduced into the adsorber vessel and passed through the bed of adsorbent material to desorb the more strongly adsorbed component, wherein the value of $(\Delta P/P)_{purge}$ is maintained below about 0.3, where $\Delta P$ is the pressure drop across the bed of adsorbent material at the end of the purge period and P is the minimum absolute pressure in the bed of adsorbent material at the end of the purge period.

The bed of adsorbent material may comprise two or more adsorbents.

In another embodiment, the invention includes a method of operating a pressure swing adsorption process which comprises:

(a) introducing a feed gas mixture at a feed gas flow rate into an inlet of an adsorber vessel during a feed period, $t_{feed}$, wherein the feed gas mixture comprises a more strongly adsorbable component and a less strongly adsorbable component and the adsorber vessel contains a bed of adsorbent material which selectively adsorbs the more strongly adsorbable component, and withdrawing a product gas enriched in the less strongly adsorbable component from an outlet of the adsorber vessel during at least a portion of the feed period;

(b) depressurizing the adsorber vessel by withdrawing a depressurization gas therefrom;

(c) purging the bed of adsorbent material during a purge period in which a purge gas is introduced at a purge gas flow rate into the adsorber vessel and passed through the bed of adsorbent material to desorb the more strongly adsorbed component; and (d) repeating (a) through (c) in a cyclic manner.

The operation of the pressure swing adsorption process may be controlled by selecting a desired value of a dimensionless cycle-compensated mass transfer coefficient defined as $K\, t_{feed} V_{ads}/V_{feed}$ and adjusting the feed gas flow rate, the duration of the feed period, or both the feed gas flow rate and the duration of the feed period to maintain the desired value of $K\, t_{feed} V_{ads}/V_{feed}$, where K is the linear driving force mass transfer coefficient for diffusion of the more strongly adsorbable component in the adsorbent closest to a product end of the bed of adsorbent material, $t_{feed}$ is the duration of the feed period, $V_{ads}$ is the empty volume of a section of the adsorber vessel which contains the bed of adsorbent material, and $V_{feed}$ is the volume of the feed gas mixture introduced into the inlet of the adsorber vessel during the feed period, and wherein $V_{feed}$ is defined as $NRT/P_{ads}$, where N is the number of moles of the feed gas mixture introduced into the inlet of the adsorber vessel during the feed period $t_{feed}$, R is the universal gas constant, T is the average absolute temperature of the feed gas mixture at the inlet of the adsorber vessel, and $P_{ads}$ is the absolute pressure of the feed gas at the inlet of the adsorber vessel.

The desired value of $K\, t_{feed} V_{ads}/V_{feed}$ may be in the range of about 23 to about 250. In this embodiment, the more strongly adsorbed component may be nitrogen and the less strongly adsorbed component may be oxygen. The desired value of $K\, t_{feed} V_{ads}/V_{feed}$ may lie between about 23 and about 100. The adsorbent material may comprise one or more zeolites, with or without binder material, selected from the group consisting of CaA, NaX, CaX, BaX, LiX, NaLSX, CaLSX, BaLSX, and LiLSX zeolites.

The more strongly adsorbed component may be carbon monoxide and the less strongly adsorbed component may be hydrogen. In this embodiment, the desired value of $K\, t_{feed} V_{ads}/V_{feed}$ may lie between about 66 and about 250. The adsorbent material may comprise one or more zeolites, with or without binder material, selected from the group consisting of CaA, NaX, CaX, BaX, LiX, NaLSX, CaLSX, BaLSX, and LiLSX zeolites.

The purge gas flow rate may be controlled such that $(\Delta P/P)_{purge}$ is maintained below about 0.3, where $\Delta P$ is the pressure drop across the bed of adsorbent material at the end of the purge period and P is the minimum absolute pressure in the bed of adsorbent material at the end of the purge period.

The bed of adsorbent material may comprise two or more adsorbents.

DETAILED DESCRIPTION OF THE INVENTION

Figure 1:
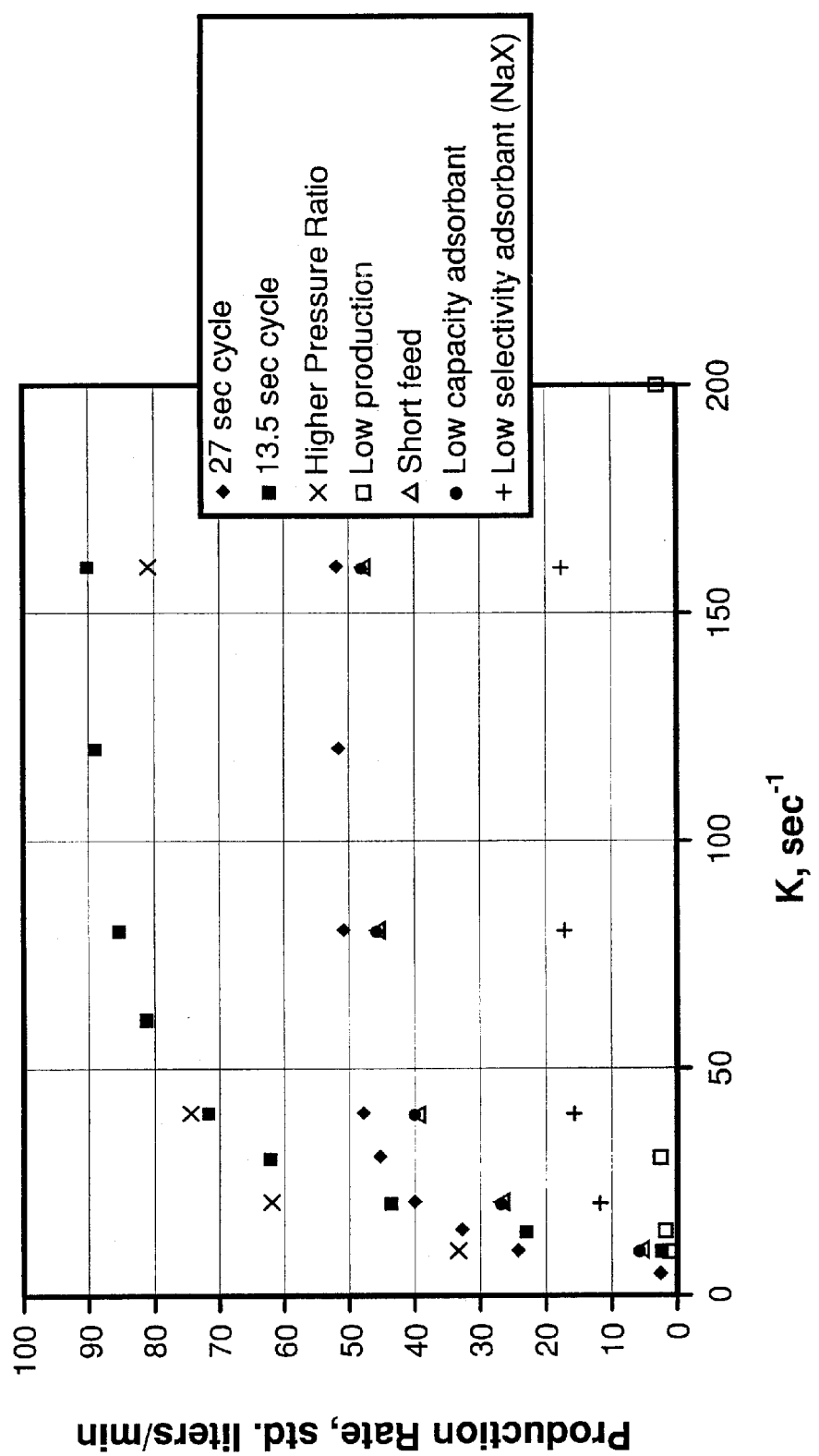
FIG. 1 is a plot of production rate vs. the linear driving force mass transfer coefficient for exemplary pressure swing adsorption processes.

PSA processes can be categorized by the nature of the interactions between the gas molecules being separated and the adsorbent material. Gas separation is effected by the fact that each component in a gas mixture is characterized by a different degree of interaction at the molecular level with the surface and internal pore structure of the adsorbent material. One type of PSA process is an equilibrium-based process in which separation is effected by different equilibrium adsorption capacities of the adsorbent for each of the components in the gas mixture. Examples of equilibrium-based separations include oxygen separation from air using zeolite adsorbents; hydrogen separation from mixtures containing methane, carbon dioxide, carbon monoxide, and hydrogen using zeolite adsorbents and/or activated carbon; and removal of water vapor from gas streams using zeolite adsorbents or activated alumina. A second type of PSA process is a kinetically-based process in which separation is effected by differing rates of adsorption of each component on the adsorbent material. Examples of kinetically-based separations include high purity nitrogen production from air using carbon molecular sieve adsorbents. The present invention pertains specifically to equilibrium-based separations using pressure swing adsorption.

The performance of an equilibrium-based PSA system is influenced by a number of parameters and system properties including working capacity, selectivity of the adsorbent, cycle time, pressure drop, pressure ratio, adsorber vessel geometry, and adsorbent mass transfer properties. The effects of some of these parameters on performance are well-known. For example, adsorbents with high working capacities and high selectivities are generally desired. For a given adsorbent material, however, the appropriate choice of cycle time and adsorber vessel geometry also has a significant impact on the performance of the system by influencing both the pressure drop in the adsorbent bed and the effects of mass transfer. Currently, no satisfactory method exists to optimize the performance of a PSA system by selecting the appropriate cycle time and vessel configuration for given adsorbent materials.

It was found unexpectedly in the development of the present invention that some of the important parameters governing the performance of PSA systems could be chosen according to a very simple criterion. It was found that adsorption systems operating with certain combinations of cycle time, adsorbent mass transfer rate, feed gas flow rate, and adsorbent volume yield optimum process performance.

The performance of PSA systems can be modeled mathematically using known adsorption process models. In the development of the present invention, mass transfer from the gas phase to the adsorbent was modeled using the well-known linear driving force mass transfer model described, for example, in PCT Publication WO 99/43416. The basic mass transfer relation is given as $$\rho_b \frac{\partial q_i}{\partial t} = K_i (c_i - c_i^*) \qquad (1)$$

where $\rho_b$ is the packed density of the adsorbent, $q_i$ is the average loading of adsorbate i on the adsorbent, t is time, $K_i$ is the linear driving force mass transfer coefficient for diffusion of component i in the adsorbent, $c_i$ is the concentration of component i in the gas phase, and $c_i^*$ is the gas concentration in equilibrium with the adsorbed phase. The mass transfer coefficient can be estimated using the equation $$K_i = \frac{60 \varepsilon_p (1-\varepsilon_b) D_p}{d_p^2} \qquad (2)$$

where $\varepsilon_p$ is the porosity of the adsorbent beads or particles, $\varepsilon_b$ is the void fraction of the adsorbent bed, $D_p$ is the effective pore diffusivity, and $d_p$ is the average bead or particle diameter. The definition of $D_p$ includes the tortuosity factor of the pores in the adsorbent.

Other forms of the linear driving force model give different expressions. For example, U.S. Pat. No. 5,672,195 describes a linear driving force model in which the linear driving force coefficient can be given by $$a_k = \frac{15 D_p}{r_p^2} \left( \frac{1}{1 + \frac{1-\varepsilon_p}{\varepsilon_p} K_h} \right) \qquad (3)$$

where, $r_p$ is the average radius of the adsorbent beads or particles, and $K_h$ is the Henry's law coefficient. $K_i$ is thus related to $a_k$ by the following relationship:

$$K_i = a_k (1-\varepsilon_b)(\varepsilon_p + (1-\varepsilon_p) K_h) \qquad (4)$$

While equation (2) provides a method to estimate $K_i$, the preferred method to determine $K_i$ is to perform a breakthrough or length-of-unused-bed test, which is a standard method to measure the kinetics of adsorption. Tests for this purpose are described in, for example, PCT Publication WO 99/43416, and analysis of breakthrough test data is described in Gas Separation by Adsorption Processes by Ralph T. Yang, Imperial College Press, 1987, pp. 141–200.

A preferred procedure for conducting the breakthrough test is described below.

1) The adsorbent to be tested is loaded into an adsorption vessel. The adsorbent bed should be sufficiently long that entrance effects are negligible. A preferred geometry for the adsorbent bed is a diameter of 1 inch and a length of 60 inches.

2) The bed is saturated with the least strongly adsorbed component of the gas mixture to be separated by flowing the least strongly adsorbed gas as a pure component into the inlet of the bed until the outlet gas composition is as close as possible to the inlet composition. The pressure, temperature and molar flow rate of the gas at the outlet of the bed should be as close as possible to the feed conditions of the actual process, for example, about 300° K and 1.5 atm for air separation.

3) The composition of the inlet gas is quickly changed to a value as close as possible to the composition of the feed gas for the actual process. The pressure, temperature and molar flow rate are not changed. The gas composition, molar flow rate, pressure, and temperature of the gas exiting the bed are monitored.

4) The results of the breakthrough test are simulated by solving the equations of mass, momentum, and energy conservation and using the linear driving force model to evaluate the rate of mass transfer from the gas phase to the adsorbent. The governing equations are described in an article by D. G. Hartzog and S. Sircar entitled "Sensitivity of PSA Process Performance to Input Variables" in Adsorption, 1, 133–151 (1995). The solution of these equations is described in the reference text cited above. Also, a simulation program that solves the governing equations is described in an article by R. Kumar, V. G. Fox, D. G. Hartzog, R. E. Larson, Y. C. Chen, P. A. Houghton, and T. Naheiri entitled "A Versatile Process Simulator for Adsorptive Separations" in Chemical Engineering Science, Vol. 49, No. 18, pp. 3115–3125.

5) The simulations are repeated with different values of $K_i$ until the values that best fit the experimental data are determined.

A PSA system for the separation of oxygen from air was simulated by using a computer program similar to that described in the article by Kumar cited above. The PSA system included a gas storage tank and a single adsorber vessel that was filled with a bed of adsorbent material. The process cycle for the system consisted of repeating the steps of feed, evacuation, and purge. The feed step comprised two stages. For the first stage, the adsorber vessel was pressurized by introducing air into its feed end. For the second stage, air continued to flow into the feed end of the adsorber vessel while an oxygen rich product gas was removed from the product end of the vessel. The oxygen rich gas flowed into the gas storage tank. For the evacuation step, the vessel was depressurized by closing off its product end and removing gas from its feed end. For the purge step, gas continued to be removed from the feed end of the vessel while purge gas from the storage tank was introduced into the product end of the vessel. A product stream was continuously withdrawn from the gas storage tank. The product stream flow rate was controlled to maintain an average oxygen concentration of 90% in the gas storage tank. The purge gas flow rate was set at a value that maximized the product stream flow rate. The feed gas temperature was 120° F. and the ambient temperature surrounding the adsorber vessel was 100° F. It was assumed that an appropriate hold-down system eliminated adsorbent fluidization and attrition.

The simulations covered the wide range of operating conditions given in Tables 1 and 2. Table 1 shows the name assigned to each set of operating conditions, the adsorbent type, adsorbent particle size, adsorbent bed diameter, and adsorbent bed length. Table 2 shows the cycle step times and the end of step pressures evaluated at the feed end of the bed of adsorbent material. For each set of operating conditions, simulations were performed with a range of mass transfer coefficients.

TABLE 1

| Set Name | Adsorbent | Adsorbent Particle Size (mm) | Adsorbent Bed Diameter (inches) | Adsorbent Bed Length (inches) |
|---|---|---|---|---|
| 27 sec cycle | Li exchanged X-type zeolite | 0.85 | 12.4 | 15.6 |
| 13.5 sec cycle | Li exchanged X-type zeolite | 0.85 | 12.4 | 15.6 |
| Higher P | Li exchanged X-type zeolite | 0.85 | 12.4 | 15.6 |
| Low production | Li exchanged X-type zeolite | 0.85 | 2.5 | 20 |
| Short feed | Li exchanged X-type zeolite | 0.85 | 12.4 | 15.6 |
| Low capacity adsorbent | Li exchanged X-type zeolite w/low capacity | 0.85 | 12.4 | 15.6 |
| Low selectivity adsorbent | Na exchanged X-type zeolite | 0.85 | 12.4 | 15.6 |

TABLE 2

| Set Name | Step times Feed/Evacuation/Purge (seconds) | End of step pressures Feed/Evacuation/Purge (atm) |
|---|---|---|
| 27 sec cycle | 10/9/8 | 1.5/0.33/0.33 |
| 13.5 sec cycle | 5/4.5/4 | 1.5/0.33/0.33 |
| Higher P | 10/9/8 | 3.0/0.33/0.33 |
| Low production | 10/9/8 | 1.5/0.33/0.33 |
| Short feed | 5/9/8 | 1.5/0.33/0.33 |
| Low capacity adsorbent | 10/9/8 | 1.5/0.33/0.33 |
| Low selectivity adsorbent | 10/9/8 | 1.5/0.33/0.33 |

The simulation results are shown in FIG. 1, in which the system production rate, defined as the flow rate of the 90% oxygen product stream, is plotted as a function of the linear driving force mass transfer coefficient for the various process cycle conditions shown in Tables 1 and 2. The production rate of standard liters per minute in FIG. 1 is defined at 70° F. and one atmosphere absolute. Certain combinations of operating conditions yield high production rates, while other combinations yield lower production rates. From the data in FIG. 1, it is clear that the performance of PSA systems is complicated and that no obvious guidelines exist to determine the optimum operating conditions.

Figure 2:
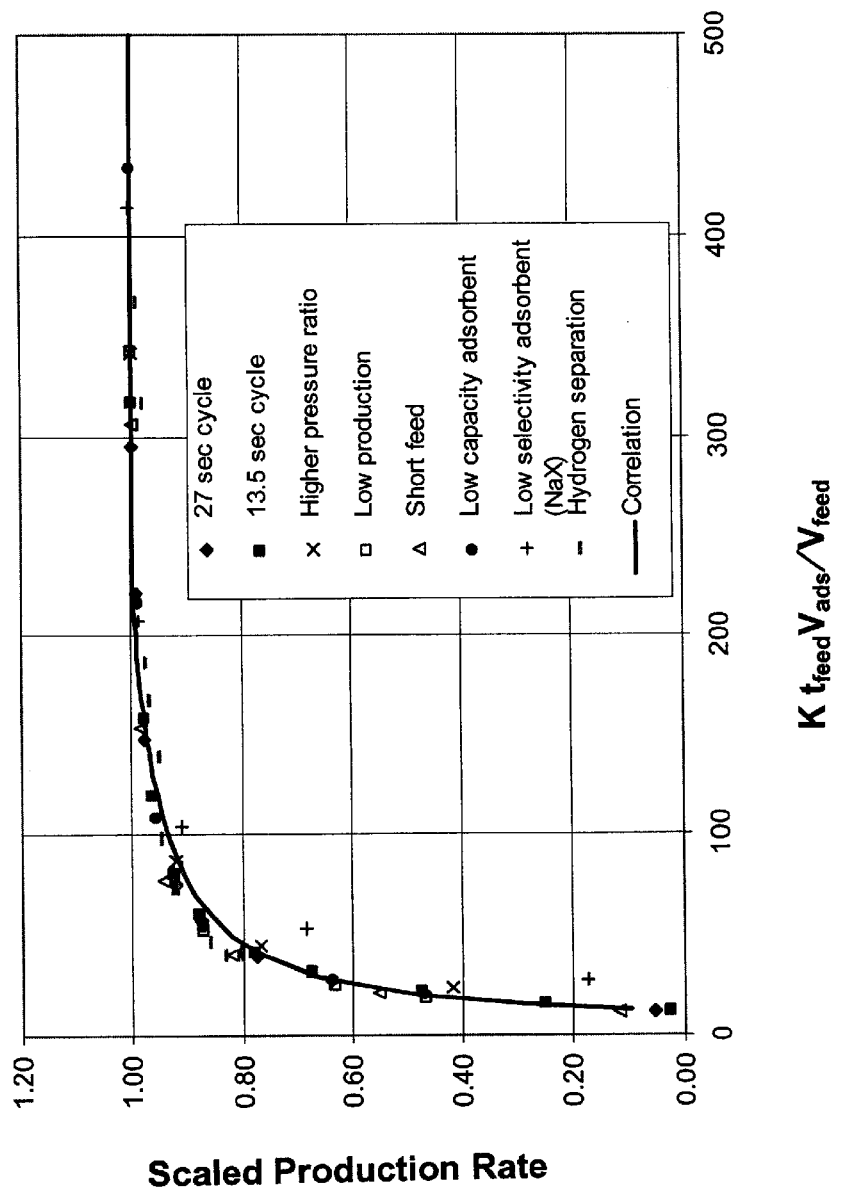
FIG. 2 is a plot of scaled production rate vs. the dimensionless cycle-compensated mass transfer coefficient for exemplary pressure swing adsorption processes.

While the results in FIG. 1 show no obvious trends, it was found that the results could be correlated as shown in FIG. 2, which is a plot of the scaled production rate as a function of a dimensionless cycle-compensated mass transfer coefficient defined as $K\ t_{feed}V_{ads}/V_{feed}$. Here, K is the linear driving force mass transfer coefficient for diffusion in the adsorbent or layer of adsorbent closest to the product end of the bed of adsorbent material of the component that limits product purity. For example, in the separation of oxygen from air, nitrogen is the component that limits oxygen product purity, and the limiting K is for nitrogen diffusion in the adsorbent closest to the product end of the bed of adsorbent material. The product end of the bed is defined herein as the surface of the bed from which product gas is withdrawn. In a cylindrical adsorber vessel containing a conventional cylindrical adsorbent bed, this surface is circular and is near or adjacent to the adsorber vessel outlet. In a cylindrical adsorber vessel containing a radial-flow adsorbent bed, this surface is cylindrical and is in flow communication with the adsorber vessel outlet. In either type of adsorbent bed, the product gas is withdrawn through the adsorber vessel outlet. $t_{feed}$ is the feed time of the adsorption system defined as the time period during which feed gas is introduced into the adsorber vessel (including feed repressurization as well as feed/make product steps), $V_{ads}$ is the empty volume of a section of the adsorber vessel which contains the bed of adsorbent material, and $V_{feed}$ is the amount of gas fed to the system during the feed time. Specifically, $V_{feed}$ is calculated as $$V_{feed} = \frac{NRT}{P_{ads}} \quad (5)$$

where N is the number of moles fed to the adsorber vessel inlet during the feed time $t_{feed}$, R is the universal gas constant, T is the average absolute temperature of the gas fed to the adsorber vessel, and $P_{ads}$ is the absolute pressure of the feed gas at the adsorber vessel inlet.

The following procedure was used to determine the scaled production rate: (1) the value of production rate that corresponds to the largest K value was selected for each set of operating conditions in FIG. 1, and (2) all the values of production rate within each set of operating conditions were divided by the selected value of production rate. The component that limits product purity is defined as the more strongly adsorbable component of the feed gas mixture that must be kept below a certain value for the product gas to be acceptable. When more than one component must be kept below a certain value, the component with the lowest value of $K_i$ should be chosen. Once the component that limits product purity is identified, $K=K_i$ where i refers to the component that limits product purity. With the dimensionless cycle-compensated mass transfer coefficient as the correlating parameter, all of the data in FIG. 2 fall along the same curve. FIG. 2 also includes results from a simulation of a PSA system for hydrogen production from a feed typical of a steam methane reformer. The data for the various oxygen production cases and the hydrogen production case all fall along the same curve.

Figure 3:
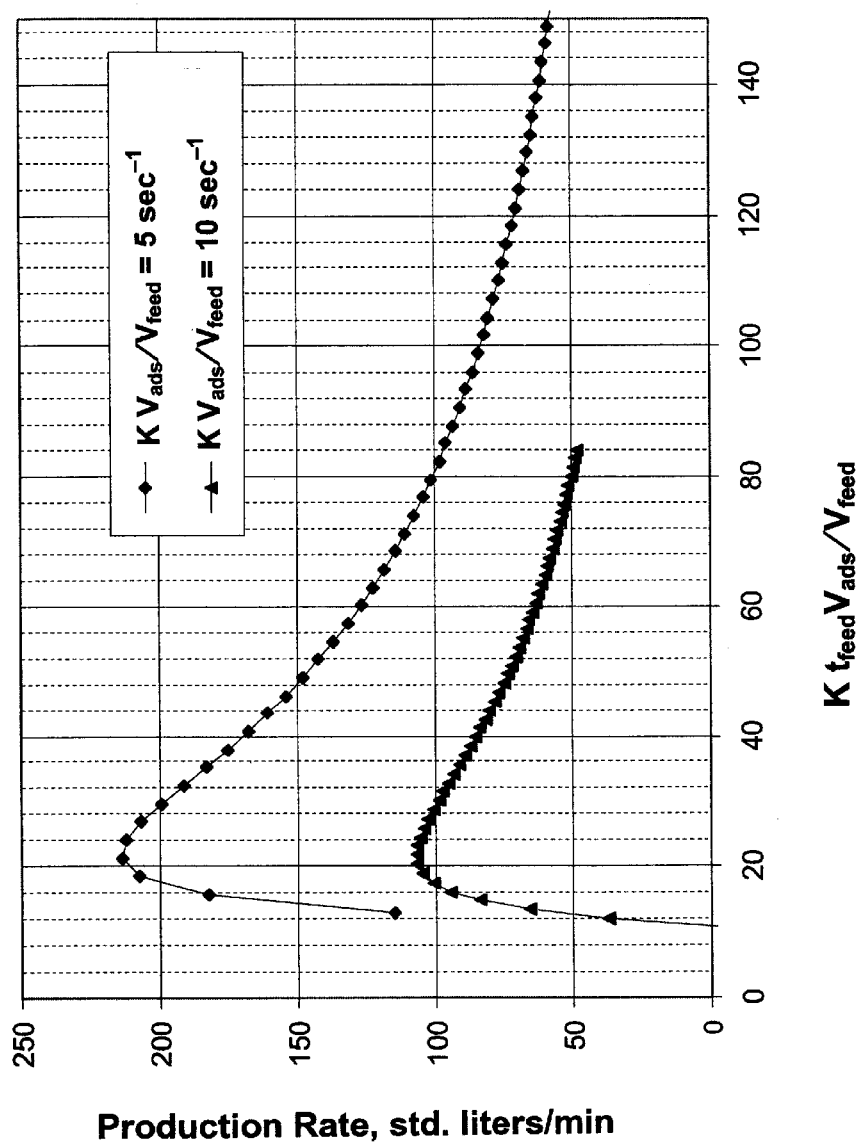
FIG. 3 is a plot of production rate vs. the dimensionless cycle-compensated mass transfer coefficient for values of $K\, V_{ads}/V_{feed}$ for exemplary pressure swing adsorption processes.

The relationship between scaled production rate and the dimensionless cycle-compensated mass transfer coefficient $K\ t_{feed}V_{ads}/V_{feed}$ was then used to calculate the production rate as a function of $K\ t_{feed}V_{ads}/V_{feed}$ for two different values of the ratio $K\ V_{ads}/V_{feed}$. The results are shown in FIG. 3, which illustrates that for each value of $K\ V_{ads}/V_{feed}$, the maximum production rate occurs at a value of $K\ t_{feed}V_{ads}/V_{feed}$ of about 23. The production rate of standard liters per minute in FIG. 3 is defined at 70° F. and one atmosphere absolute. The adsorbent requirement, which is defined as the weight of adsorbent in kilograms divided by the production rate of the system in standard liters per minute, is inversely proportional to the production rate. The operating conditions that maximize production rate are thus the same operating conditions that minimize adsorbent requirement.

Figure 4:
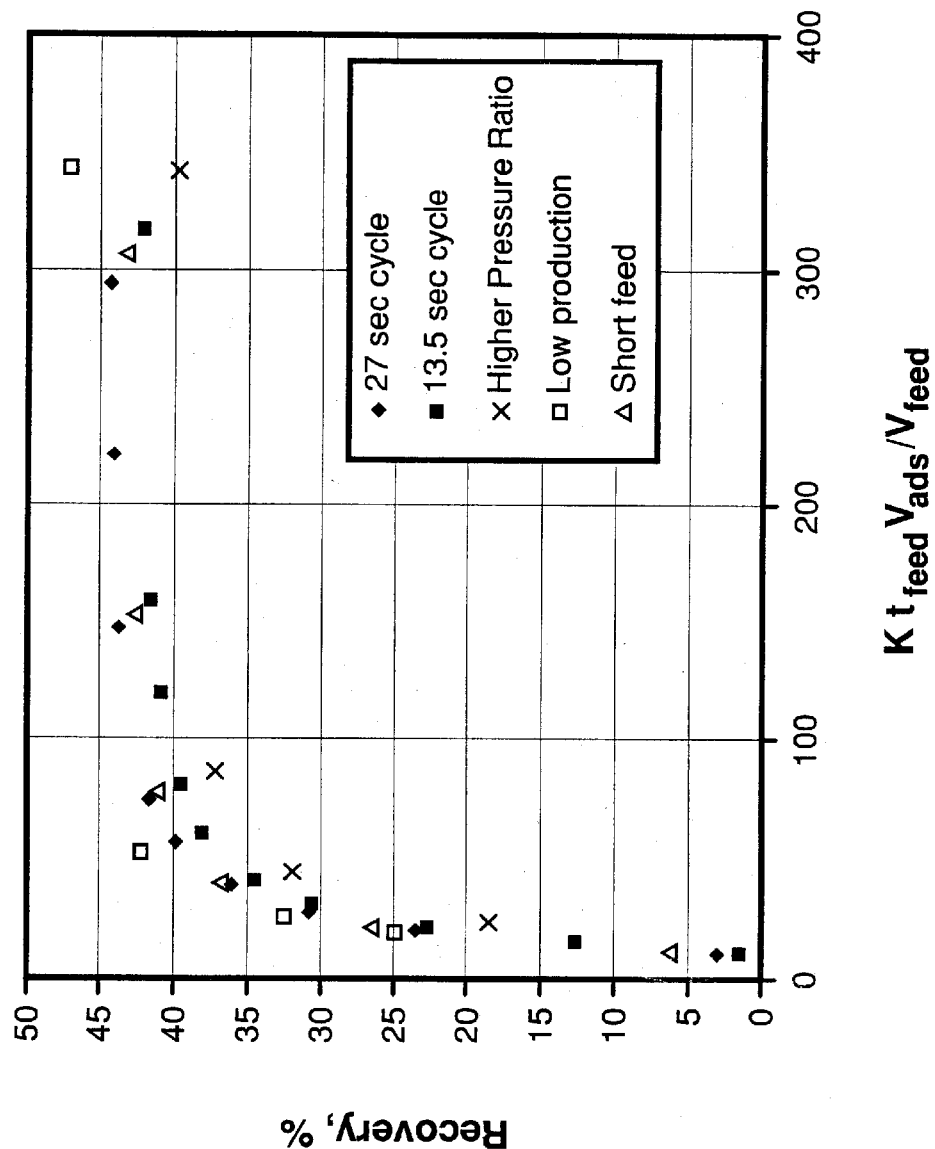
FIG. 4 is a plot of % recovery vs. the dimensionless cycle-compensated mass transfer coefficient for exemplary pressure swing adsorption processes.

Another important performance parameter for a PSA system is the recovery, defined as the molar percentage of desired product fed to the adsorption system that leaves with the product stream. The recovery as a function of $K\ t_{feed}V_{ads}/V_{feed}$ is given in FIG. 4, which shows that a maximum value for recovery is approached asymptotically as the value of $K\ t_{feed}V_{ads}/V_{feed}$ is increased. Since the maximum recovery is approached asymptotically, in practice the upper limit of $K\ t_{feed}V_{ads}/V_{feed}$ is chosen so that the recovery is at least about 99% of the asymptotic limit. From FIG. 4 it can be seen that 99% of the asymptotic recovery limit occurs at a $K\ t_{feed}V_{ads}/V_{feed}$ value of about 250. A generic PSA system is operated such that the dimensionless cycle-compensated mass transfer coefficient is in the range of about $23 < K\ t_{feed}V_{ads}/V_{feed} < 250$. For oxygen production systems, in which a small adsorbent requirement is important, a more preferred range of operation is about $23<K\ t_{feed}V_{ads}/V_{feed}<100$. For hydrogen production, an operating range of about $66<K\ t_{feed}V_{ads}/V_{feed}<250$ is preferred since product recovery is an important operating factor.

Figure 5:
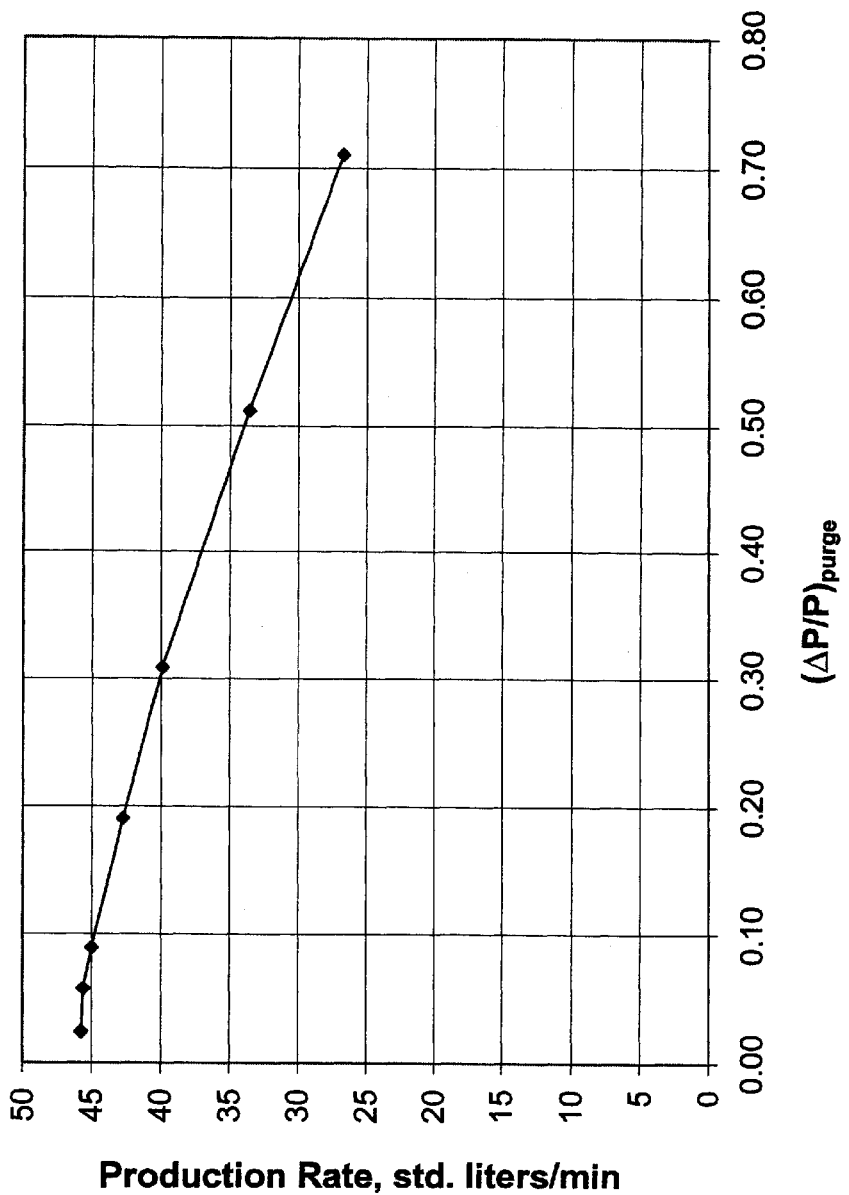
FIG. 5 is a plot of production rate vs. $(\Delta P/P)_{purge}$ for oxygen production from air.

To achieve the maximum benefit from this mode of operation, the negative effects associated with pressure drop should not limit performance. The effects of pressure drop on system performance were determined by simulating PSA systems used to produce oxygen from air. The process cycles and the operating conditions for the simulated systems were similar to those for the '27 sec cycle' case in Tables 1 and 2. The adsorbent volume was held constant, and simulations were performed for various ratios of the adsorbent bed length L to the adsorbent bed cross-sectional area A. The results are shown in FIG. 5, in which production rate is plotted as a function of $(\Delta P/P)_{purge}$ where $\Delta P$ is the pressure drop across the bed of adsorbent material at the end of the purge period and P is the minimum absolute pressure in the bed of adsorbent material at the end of the purge period. The production rate of standard liters per minute in FIG. 5 is defined at 70° F. and one atmosphere absolute. The systems with smaller values of $(\Delta P/P)_{purge}$ give higher production rates, and systems with a $(\Delta P/P)_{purge}$ of below about 0.3 are preferred. In practice, the value $(\Delta P/P)_{purge}$ can be minimized by using a bed of adsorbent material with a small value of L/A. Adsorbent beds with small values of L/A also have a decreased likelihood of adsorbent fluidization and attrition.

The generic term "adsorbent material" as used herein means any material or combination of materials capable of adsorbing gaseous components. The term "adsorbent" refers to a specific type of adsorbent material, for example, activated carbon. An adsorbent may be in the form of porous granular material such as, for example, beads, granules, and extrudates. Alternatively, an adsorbent may be in the form of a self-supported structure such as, for example, a sintered bed, monolith, laminate, or fabric configuration. The present invention can be applied to any of these types of adsorbents.

A bed of adsorbent material is defined as a fixed zone of one or more adsorbents through which the gas mixture flows during the separation process. The bed of adsorbent material may contain a single type of adsorbent or alternatively may contain layers or zones of different types of adsorbents. When multiple layers are used, the adsorbent closest to the product end of the bed of adsorbent material is used to define the limiting value of K as discussed above.

The following Examples illustrate the present invention but do not limit the invention to any of the specific details described therein.

EXAMPLE 1

This example illustrates the performance a PSA system operating (1) with a long cycle time typical of prior art (see A New Process for Adsorption Separation of Gas Streams by G. E. Keller II and R. L. Jones, ACS Symposium Series 135, 1980, pp. 275–286) with ~1.4 mm average diameter adsorbent beads; (2) with a short cycle time with ~1.4 mm average diameter adsorbent beads; and (3) with a short cycle time with smaller particles (~0.85 mm average diameter). The PSA system includes a gas storage tank and a single adsorber vessel that is filled with a bed of adsorbent. Air is fed to the system, and a product stream with an oxygen concentration of 90% is produced. The PSA process cycle consists of a feed step with an end of step pressure of 1.5 atm, an evacuation step with an end of step pressure of 0.33 atm, and a purge step with an end of step pressure of 0.33 atm. The purge gas flow rate is chosen to maximize the product stream flow rate. The ratio of the evacuation time to the feed time is 0.9 to 1, and the ratio of the purge time to the feed time is 0.8 to 1. The feed gas temperature is 120° F. and the ambient temperature is 100° F. The adsorbent is a lithium exchanged X-type zeolite, and the adsorbent bed is cylindrical with a 12.4 inch diameter and a 15.6 inch length. For this system, a small adsorbent requirement is important and high recovery is of secondary importance.

For three different cases, Table 3 shows the feed time, the linear driving force mass transfer coefficient for nitrogen diffusion in the adsorbent, the adsorbent particle size, the dimensionless cycle-compensated mass transfer factor, the adsorbent requirement (kg of adsorbent per standard liter per minute of product), and the recovery. The long cycle time case has a high recovery, but the adsorbent requirement is very large. The short cycle time case with the same size particles has a smaller adsorbent requirement, but the recovery is very low. Optimal performance is achieved for the short cycle time, small particle case that is in the preferred range of the dimensionless cycle-compensated mass transfer factor for oxygen production systems (23–100). The adsorbent requirement is very small compared to the other cases, and the recovery is rather high.

TABLE 3

| $t_{feed}$ (sec) | $K(sec^{-1})$ | $d_p$(mm) | $K\ t_{feed}V_{ads}/V_{feed}$ | Adsorbent Requirement (kg/slpm) | Recovery (%) |
|---|---|---|---|---|---|
| 60 | 12 | 1.4 | 119 | 2.0 | 46.5 |
| 5 | 12 | 1.4 | 13.8 | 1.65 | 6.4 |
| 5 | 32 | 0.85 | 34.0 | 0.3 | 31.6 |

EXAMPLE 2

This Example illustrates the effects of various cycle times and mass transfer rates on a PSA system. The PSA system is similar to that described in Example 1, but with a different adsorbent bed size. In the present example, the adsorbent bed has a 6 inch diameter and a 4.9 inch length.

For three different sets of operating conditions, Table 4 shows the feed time, the linear driving force mass transfer coefficient for nitrogen diffusion in the adsorbent, the adsorbent particle size, the dimensionless cycle-compensated mass transfer factor, the adsorbent requirement, and the recovery. The set of operating conditions with the highest value of $K\ t_{feed}V_{ads}/V_{feed}$ has a high recovery and a large adsorbent requirement, and the set with the lowest value of $K\ t_{feed}V_{ads}/V_{feed}$ has a low recovery and a large adsorbent requirement. The optimum operating conditions are those with a $t_{feed}$ of 6 sec and a value of $K\ t_{feed}V_{ads}/V_{feed}$ within the preferred range for oxygen production of 23 to 100. For this set of conditions, the adsorbent requirement is very small, and the recovery is similar to that of the set with the highest value of $K\ t_{feed}V_{ads}/V_{feed}$.

TABLE 4

| $t_{feed}$ (sec) | K (sec$^{-1}$) | $d_p$ (mm) | $K\ t_{feed}V_{ads}/V_{feed}$ | Adsorbent Requirement (kg/slpm) | Recovery (%) |
|---|---|---|---|---|---|
| 30 | 88 | 0.5 | 446 | 0.88 | 53.0 |
| 6 | 88 | 0.5 | 97.7 | 0.21 | 48.7 |
| 5 | 12 | 1.4 | 13.4 | 0.87 | 11.8 |

EXAMPLE 3

A PSA system for oxygen production from air was operated with various sets of operating conditions. Key components of the system included an adsorber vessel, a gas storage tank, one or two blowers, and several check valves. For some sets of operating conditions, the unit was configured as shown in FIG. 1 of U.S. Pat. No. 6,156,101. For other sets, the configuration was modified by replacing the single blower (component 11 in FIG. 1 in U.S. Pat. No. 6,156,101) with two blowers in parallel and by replacing each of the check valves (components 23 and 43 in the same figure) with two check valves in parallel. For both configurations, the unit was operated in a manner described in the text of U.S. Pat. No. 6,156,101.

For both configurations, the same adsorber vessel, gas storage tank, and type of check valves were used. The adsorbent vessel was cylindrical with a 2.6 inch inside diameter and a 17.75 inch length. The vessel was loaded with adsorbent to a height of about 17 inches. A hold down device inside the adsorber vessel was used to prevent fluidization of the adsorbent. The gas storage tank had a 2250 cubic centimeter volume that was filled with 13× adsorbent. Swagelok inline adjustable check valves (part number B-4CA-3) were used as feed and purge check valves. Feed check valves refer to those which allow gas to flow from the adsorber vessel to the gas storage tank (for example component 23 in FIG. 1 of U.S. Pat. No. 6,156,101), and purge check valves refer to those which allow gas to flow from the gas storage tank to the adsorber vessel (for example component 43 in FIG. 1 of U.S. Pat. No. 6,156,101). The feed check valves were adjusted to achieve a crack pressure of about 3.5 psi, and the purge check valves were adjusted to achieve a crack pressure of about 14 psi.

For four different sets of operating conditions spanning both configurations, Table 5 shows the adsorbent type, adsorbent particle size, step times, end of step pressures and oxygen purity. In Table 5, feed time refers to the total amount of time that gas entered the feed end of the adsorber vessel (sum of air feed, dual-end repressurization, and feed repressurization as referenced in U.S. Pat. No. 6,156,101), and evacuation time refers to the total amount of time that gas exited the feed end of the adsorber vessel (sum of evacuation and evacuation/purge as referenced in U.S. Pat. No. 6,156,101). For the cases with an 11.6 second feed time, the system was configured with a single Gast 72R645-P112-D303X blower, a single feed check valve, and a single purge check valve. For the cases with a 5.7 second feed time, the system was configured with two Gast 72R645-P112-D303X blowers in parallel, two feed check valves in parallel, and two purge check valves in parallel.

The mass transfer coefficient for nitrogen diffusion in the adsorbent, the production rate, and the recovery were measured, and the results are shown in Table 6. The behavior with respect to the cycle-compensated mass transfer coefficient, $K\, t_{feed}V_{ads}/V_{feed}$, is identical to that observed for the simulations described earlier. For Case $1_a$, $K\, t_{feed}V_{ads}/V_{feed}$ is equal to 115, which is just outside of the preferred range for oxygen production (23–100). For this case the recovery and production rate are both rather high. For Case 1b, $K\, t_{feed}V_{ads}/V_{feed}$ is lower at 58, and the production rate increased significantly with a very modest decline in recovery. This result illustrates that values of $K\, t_{feed}V_{ads}/V_{feed}$ in the preferred range yield optimal performance. For Case 2a, $K\, t_{feed}V_{ads}/V_{feed}$ is in the preferred range, whereas for Case 2b, the value of $K\, t_{feed}V_{ads}/V_{feed}$ is outside of the preferred range. The production rate and recovery is higher for Case 2a compared to Case 2b, which further illustrates that optimum performance is observed for $K\, t_{feed}V_{ads}/V_{feed}$ within the preferred range of 23–100 for an oxygen production process. Better performance is achieved for Cases 1a and 1b compared with Cases 2a and 2b. This trend is consistent with that observed for the simulations described above, specifically that higher values of $K\, V_{ads}/V_{feed}$ generally lead to superior performance.

TABLE 5

| Case | Adsorbent | Adsorbent particle size (mm) | Step times Feed/ Evacuation (seconds) | End of step pressures Feed/ Evacuation (atm) | Oxygen Purity (%) |
|---|---|---|---|---|---|
| 1a | Ceca Siliporite G5085B | 0.85 | 11.6/12 | 2.7/0.5 | 92 |
| 1b | Ceca Siliporite G5085B | 0.85 | 5.7/6.7 | 2.7/0.5 | 92 |
| 2a | Tosoh NSA-100 | 1.4 | 11.6/12 | 2.8/0.5 | 86 |
| 2b | Tosoh NSA-100 | 1.4 | 5.7/7.3 | 2.8/0.5 | 86 |

TABLE 6

| Case | $K$ (sec$^{-1}$) | $K\, V_{ads}/V_{feed}$ (sec$^{-1}$) | $K\, t_{feed}V_{ads}/V_{feed}$ | Production Rate (slpm) | Recovery (%) |
|---|---|---|---|---|---|
| 1a | 60 | 9.95 | 115 | 4.0 | 30.3 |
| 1b | 60 | 10.7 | 58 | 6.7 | 27.6 |
| 2a | 17 | 2.80 | 32 | 3.2 | 24.0 |
| 2b | 17 | 2.86 | 16 | 1.2 | 5.0 |

EXAMPLE 4

The recovery of hydrogen from a typical steam methane reformer effluent gas was carried out in 1" OD columns filled with two layers of adsorbent material: 60% activated carbon and 40% 5A zeolite by volume. The carbon layer was at the feed end of the column, and the zeolite layer was at the product end. The activated carbon was Calgon APHP granules with a loading density greater than 34 lb/cuft and a 0.56 cc/gram pore volume as determined through mercury porosimetry. The zeolite was UOP 5A-HP beads. The feed to the adsorption unit was 73% volume hydrogen, 15% carbon dioxide, 5.5% methane, 5.5% carbon monoxide, and 1% nitrogen at 325 psig. The purification was accomplished using the cycle described by FIG. 3 of U.S. Pat. No. 3,430,418 with five adsorbent columns and 2 steps of pressure equalization. The columns were regenerated at 6 psig. The feed rate to the adsorption unit was controlled to maintain a hydrogen product containing 10 ppm carbon monoxide. The cycle time and adsorbent were changed to vary $K\, t_{feed}V_{ads}/V_{feed}$, where K is the linear driving force coefficient for CO diffusion in UOP 5A-HP beads. The column height was changed to maintain <4 psi pressure drop during the purge step.

The results are given in Table 7. The bed sizing factor (inverse productivity) goes through a minimum as $K\, t_{feed}V_{ads}/V_{feed}$ increased from 18 to 138. Bed sizing factor is defined as the total quantity of adsorbent required to produce 1000 cubic feet per hour of contained hydrogen product. Recovery increased as the value of $K\, t_{feed}V_{ads}/V_{feed}$ increased. For many hydrogen purification applications, a greater emphasis is placed on recovery at the expense of productivity. Thus, in practical applications, the system preferably is designed and operated such that $K\, t_{feed}V_{ads}/V_{feed}$ is in the higher range of 66 to 250.

TABLE 7

| Bed Height (feet) | $t_{feed}$ (sec) | K (sec$^{-1}$) | K $t_{feed}V_{ads}/V_{feed}$ | Bed Sizing Factor (ft$^3_{ads}$/Mscfh H$_2$) | Recovery (%) |
|---|---|---|---|---|---|
| 5 | 16 | 1.60 | 18 | 1.35 | 67.2 |
| 5 | 16 | 5.56 | 49 | 0.94 | 77.5 |
| 5 | 30 | 5.56 | 77 | 1.40 | 82.3 |
| 20 | 240 | 1.60 | 138 | 8.00 | 89.8 |

What is claimed is:

1. A pressure swing adsorption process which comprises introducing a feed gas mixture into an inlet of an adsorber vessel during a feed period, wherein the feed gas mixture contains a more strongly adsorbable component and a less strongly adsorbable component and the adsorber vessel contains a bed of adsorbent material which selectively adsorbs the more strongly adsorbable component, and withdrawing a product gas enriched in the less strongly adsorbable component from an outlet of the adsorber vessel during at least a portion of the feed period, wherein a dimensionless cycle-compensated mass transfer coefficient defined as K $t_{feed}V_{ads}/V_{feed}$ is maintained in the range of about 23 to about 250, where K is the linear driving force mass transfer coefficient for diffusion of the more strongly adsorbable component in the adsorbent closest to a product end of the bed of adsorbent material, $t_{feed}$ is the duration of the feed period, $V_{ads}$ is the empty volume of a section of the adsorber vessel which contains the bed of adsorbent material, and $V_{feed}$ is the volume of the feed gas mixture introduced into the inlet of the adsorber vessel during the feed period, and wherein $V_{feed}$ is defined as NRT/$P_{ads}$, where N is the number of moles of the feed gas mixture introduced into the inlet of the adsorber vessel during the feed period $t_{feed}$, R is the universal gas constant, T is the average absolute temperature of the feed gas mixture at the inlet of the adsorber vessel, and $P_{ads}$ is the absolute pressure of the feed gas at the inlet of the adsorber vessel.

2. The process of claim 1 wherein the more strongly adsorbed component is nitrogen and the less strongly adsorbed component is oxygen.

3. The process of claim 2 wherein K $t_{feed}V_{ads}/V_{feed}$ is maintained in the range of about 23 to about 100.

4. The process of claim 2 wherein the adsorbent material comprises one or more zeolites, with or without binder material, selected from the group consisting of CaA, NaX, CaX, BaX, LiX, NaLSX, CaLSX, BaLSX, and LiLSX zeolites.

5. The process of claim 1 wherein the more strongly adsorbed component is carbon monoxide and the less strongly adsorbed component is hydrogen.

6. The process of claim 5 wherein K $t_{feed}V_{ads}/V_{feed}$ is maintained in the range of about 66 to about 250.

7. The process of claim 5 wherein the adsorbent material comprises one or more zeolites, with or without binder material, selected from the group consisting of CaA, NaX, CaX, BaX, LiX, NaLSX, CaLSX, BaLSX, and LiLSX zeolites.

8. The process of claim 1 wherein the duration of the feed period is in the range of about 7 to about 120 seconds and the adsorbent material comprises particles with an average particle diameter in the range of about 1.2 to about 1.6 mm.

9. The process of claim 1 wherein the duration of the feed period is in the range of about 3 to about 60 seconds and the adsorbent material comprises particles with an average particle diameter in the range of about 0.8 to about 1.2 mm.

10. The process of claim 1 wherein the duration of the feed period is in the range of about 0.25 to about 30 seconds and the adsorbent material comprises particles with an average particle diameter in the range of about 0.3 to about 0.8 mm.

11. The process of claim 1 which further comprises a purge period during which a purge gas is introduced into the adsorber vessel and passed through the bed of adsorbent material to desorb the more strongly adsorbed component, wherein the value of $(\Delta P/P)_{purge}$ is maintained below about 0.3, where $\Delta P$ is the pressure drop across the bed of adsorbent material at the end of the purge period and P is the minimum absolute pressure in the bed of adsorbent material at the end of the purge period.

12. The process of claim 1 wherein the bed of adsorbent material comprises two or more adsorbents.

13. A method of operating a pressure swing adsorption process which comprises:
(a) introducing a feed gas mixture at a feed gas flow rate into an inlet of an adsorber vessel during a feed period, $t_{feed}$, wherein the feed gas mixture comprises a more strongly adsorbable component and a less strongly adsorbable component and the adsorber vessel contains a bed of adsorbent material which selectively adsorbs the more strongly adsorbable component, and withdrawing a product gas enriched in the less strongly adsorbable component from an outlet of the adsorber vessel during at least a portion of the feed period;
(b) depressurizing the adsorber vessel by withdrawing a depressurization gas therefrom;
(c) purging the bed of adsorbent material during a purge period in which a purge gas is introduced at a purge gas flow rate into the adsorber vessel and passed through the bed of adsorbent material to desorb the more strongly adsorbed component; and
(d) repeating (a) through (c) in a cyclic manner;
wherein the operation of the pressure swing adsorption process is controlled by selecting a desired value of a dimensionless cycle-compensated mass transfer coefficient defined as K $t_{feed}V_{ads}/V_{feed}$ and adjusting the feed gas flow rate, the duration of the feed period, or both the feed gas flow rate and the duration of the feed period to maintain the desired value of K $t_{feed}V_{ads}/V_{feed}$, where K is the linear driving force mass transfer coefficient for diffusion of the more strongly adsorbable component in the adsorbent closest to a product end of the bed of adsorbent material, $t_{feed}$ is the duration of the feed period, $V_{ads}$ is the empty volume of a section of the adsorber vessel which contains the bed of adsorbent material, and $V_{feed}$ is the volume of the feed gas mixture introduced into the inlet of the adsorber vessel during the feed period, and wherein $V_{feed}$ is defined as NRT/$P_{ads}$, where N is the number of moles of the feed gas mixture introduced into the inlet of the adsorber vessel during the feed period $t_{feed}$, R is the universal gas constant, T is the average absolute temperature of the feed gas mixture at the inlet of the adsorber vessel, and $P_{ads}$ is the absolute pressure of the feed gas at the inlet of the adsorber vessel.

14. The method of claim 13 wherein the desired value of K $t_{feed}V_{ads}/V_{feed}$ is in the range of about 23 to about 250.

15. The method of claim 14 wherein the more strongly adsorbed component is nitrogen and the less strongly adsorbed component is oxygen.

16. The method of claim 15 wherein the desired value of K $t_{feed}V_{ads}/V_{feed}$ is in between about 23 and about 100.

17. The method of claim 15 wherein the adsorbent material comprises one or more zeolites, with or without binder material, selected from the group consisting of CaA, NaX, CaX, BaX, LiX, NaLSX, CaLSX, BaLSX, and LiLSX zeolites.

18. The method of claim 14 wherein the more strongly adsorbed component is carbon monoxide and the less strongly adsorbed component is hydrogen.

19. The method of claim 18 wherein the desired value of $K\, t_{feed} V_{ads}/V_{feed}$ is between about 66 and about 250.

20. The method of claim 18 wherein the adsorbent material comprises one or more zeolites, with or without binder material, selected from the group consisting of CaA, NaX, CaX, BaX, LiX, NaLSX, CaLSX, BaLSX, and LiLSX zeolites.

21. The method of claim 13 wherein the purge gas flow rate is controlled such that $(\Delta P/P)_{purge}$ is maintained below about 0.3, where $\Delta P$ is the pressure drop across the bed of adsorbent material at the end of the purge period and P is the minimum absolute pressure in the bed of adsorbent material at the end of the purge period.

22. The method of claim 13 wherein the bed of adsorbent material comprises two or more adsorbents.

* * * * *